(12) United States Patent
Collins

(10) Patent No.: US 6,176,034 B1
(45) Date of Patent: Jan. 23, 2001

(54) FISHING ROD BUTT AND REEL SEAT ASSEMBLY

(76) Inventor: Stuart Collins, 526 NE. 190th St., North Miami Beach, FL (US) 33179

( * ) Notice: Under 35 U.S.C. 154(b), the term of this patent shall be extended for 0 days.

(21) Appl. No.: 08/870,003

(22) Filed: Jun. 6, 1997

(51) Int. Cl.[7] ............ A01K 87/06; A01K 87/08
(52) U.S. Cl. .................. 43/20; 43/22; 43/23
(58) Field of Search .............. 43/18.1, 22, 20, 43/23; 16/114 R, 116 R, DIG. 12

(56) References Cited

U.S. PATENT DOCUMENTS

| | | | |
|---|---|---|---|
| 1,980,316 | * | 11/1934 | Breder . |
| 4,083,141 | * | 4/1978 | Shedd ........................ 43/22 |
| 4,197,611 | * | 4/1980 | Bell ........................... 16/116 R |
| 4,467,548 | * | 8/1984 | Tabor ......................... 43/23 |
| 4,471,209 | * | 9/1984 | Hollander .................. 219/204 |
| 4,559,671 | * | 12/1985 | Andrews .................... 16/111 R |
| 4,637,157 | * | 1/1987 | Collins ....................... 43/22 |
| 4,872,623 | * | 10/1989 | Parry ......................... 242/96 |
| 5,288,359 | * | 2/1994 | Stobbie, IV ............... 156/294 |

* cited by examiner

*Primary Examiner*—Jack W. Lavinder
(74) *Attorney, Agent, or Firm*—Malloy & Malloy, P.A.

(57) ABSTRACT

The present invention is directed towards an improved fishing butt and reel seat assembly and comprises a substantially strong, rigid, one piece rod having a first open end, a second open end and a main length extending therebetween with a hollow interior in communication with both open ends having a substantially constant inner diameter. The rod includes a reel seat portion, a shank portion, and preferably, a gimbal receiving portion. The reel seat portion preferably includes an abutment section with an enlarged exterior diameter disposed generally adjacent the shank portion. The exterior diameter of the abutment section is larger than that of the reel seat portion but smaller than the exterior diameter of the shank portion which is the largest. The invention additionally comprises a gripping sleeve having a first and a second open end and a main length sized to generally correspond the shank portion of the rod for being slidably mounted and secured thereon, and a gimbal structured to be slidably mounted and secured on the gimbal receiving portion of the rod in abutting engagement with the shank portion and the second end of the gripping sleeve. Finally, the invention additionally comprises an externally threaded zone on the rod, at least one locking nut threadably mounted thereto and at least one annular hood mounted onto the reel seat portion of the rod, preferably on said abutment section.

16 Claims, 2 Drawing Sheets

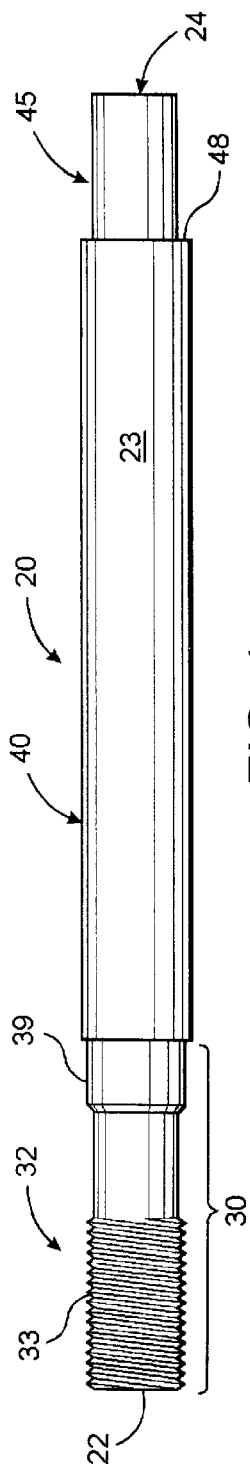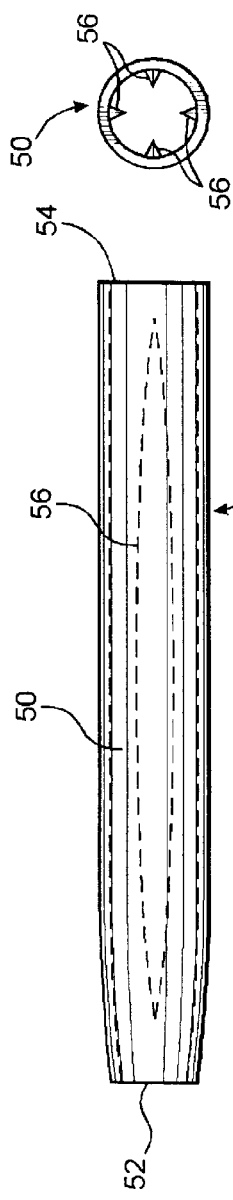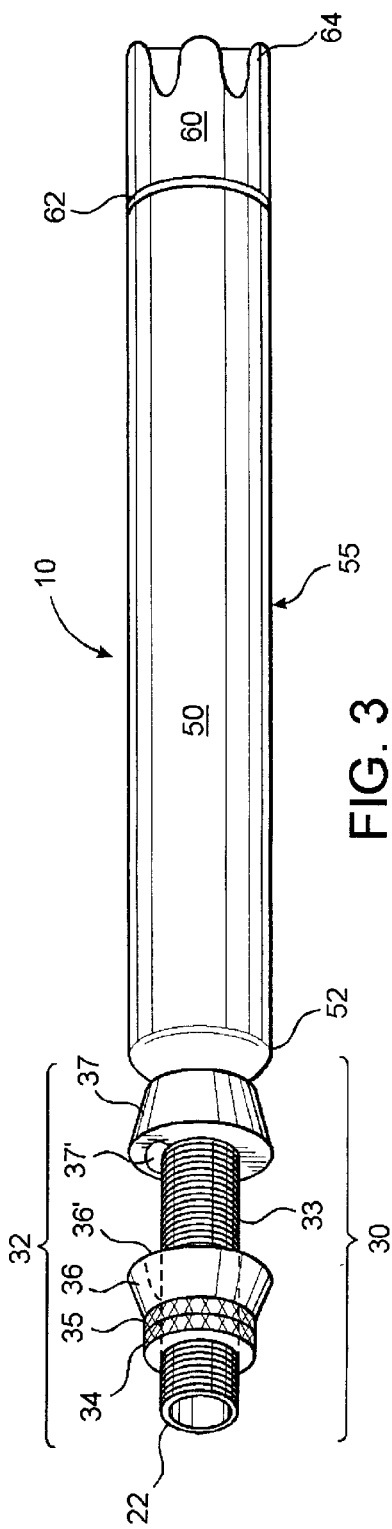

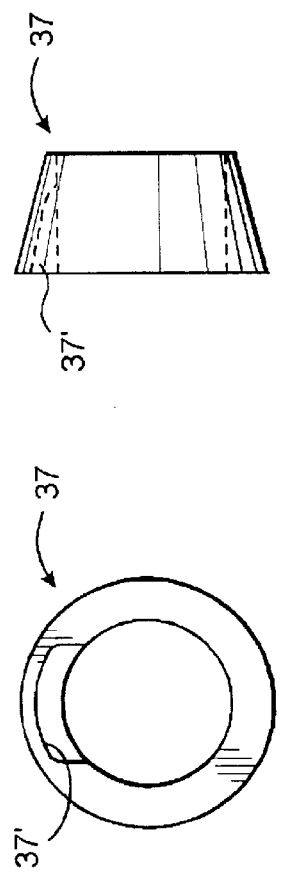
FIG. 4A
FIG. 4B
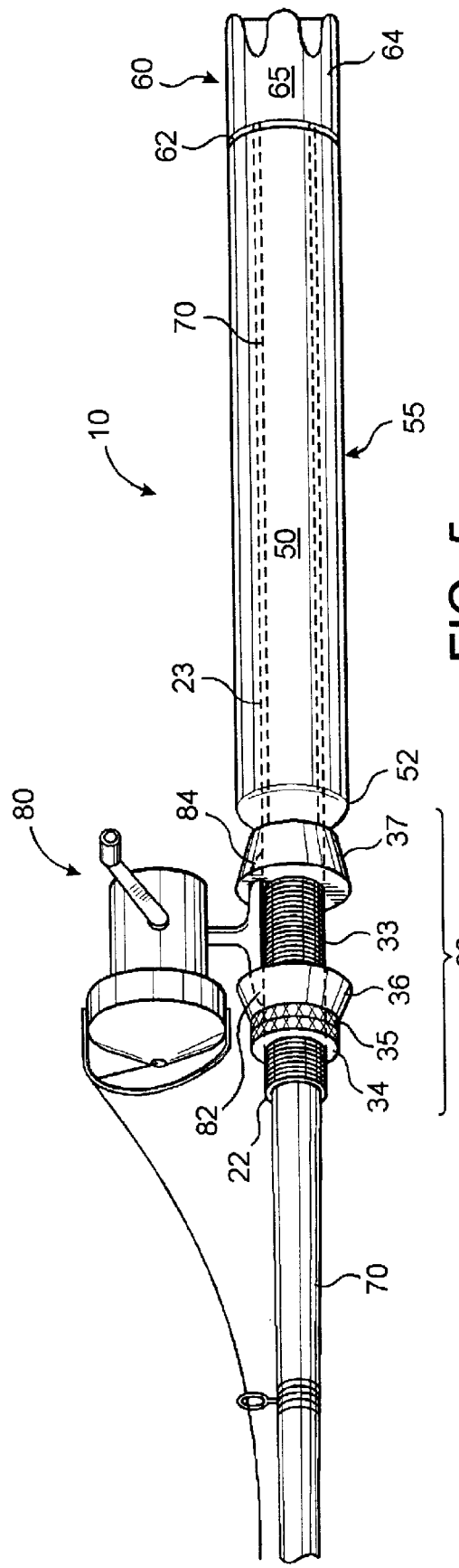
FIG. 5

FISHING ROD BUTT AND REEL SEAT ASSEMBLY

BACKGROUND OF THE INVENTION

1. Field of the Invention

The present invention relates generally to fishing rods and more particularly, to a fishing rod butt and reel seat assembly for use in receiving and supporting a fishing rod and fishing reel thereon that is specifically structured to minimize manufacturing costs and assembly time while providing at the same time, a substantially strong device able to withstand the large bending forces, loads, stresses and otherwise heavy duty use to which such devices are often subjected.

2. Description of the Related Art

Most conventional fishing rods used for deep sea sport fishing are made of three primary sections, namely, an elongate rod blank, a handle or butt, and a reel seat. Typically, the distal end of the elongate rod blank is intended to be fitted within the handle or butt. The reel seat is commonly secured directly to the butt rather than to the fishing rod itself. The end of the butt is frequently in the form of a gimbal having intersecting notches, and therefore, the distal end of the butt is specifically configured to be received within a socket permanently but movably mounted on a "fighting chair" on as boat or even on a "fighting belt" secured to a fisherman. In the sport of game fishing, strong forces are often encountered, which forces are transmitted through the rod to the butt assembly. Many fishing rods are not able to withstand the tremendous stress associated with deep sea fishing and have a tendency to break under the high load conditions inherent in the sport. Given the enormous amount of stress and "bending forces" placed on the butt assembly, it is imperative that its construction and design be adequate to withstand the aforementioned forces and to maintain a certain amount of structural integrity throughout its life.

Various fishing butt and reel seat assemblies have been designed in the past to overcome the tendency to break under the high load conditions present in the sport of game fishing. Many of the known devices are constructed from a plurality of intricately machined or interlocking parts in order to increase the structural strength and durability of the fishing butt assembly. A recurring problem however, is that the manufacturing process for such devices is labor intensive and costly. In an effort to reduce the increased costs associated with such multi-part butt assemblies, others have designed unitary or one piece fishing butt and reel seat assemblies. Known unitary designs, however, are viewed as having problems in terms of their structural integrity and ability to adequately withstand the heavy duty use to which they are exposed. Alternatively, the materials used to construct other known unitary fishing butt assemblies often hinder the performance of the fisherman or are simply unreliable. For instance, in order to provide a unitary fishing butt assembly which is sufficiently strong to meet the structural demands of the sport, some in the art have formed the entire fishing butt structure out of a sturdy, solid metallic material. This, however, results in the device being expensive in that costly metal finishing is required but also, results in the device being slippery, heavy, cumbersome and only expedient to the fatiguing of the fisherman. In addition, such devices are susceptible to rapid heating and becoming too hot to handle, particularly given that most deep sea fishing occurs in highly sunny conditions with no shade available. Consequently, many such devices utilize insulating materials such as foam, cork or wood to form a gripping surface for the user and to protect the user's hands from the heat conductive metals. A problem frequently encountered in such devices is that the metallic and insulating materials have different thermal expansion coefficients and therefore, expand and contract at different rates, which has resulted in the cracking and general deterioration of the insulating material.

It would, therefore, be highly advantageous to provide a unitary fishing butt and reel seat assembly which overcomes the afore-mentioned problems in the art. Specifically, it would be highly beneficial to provide a unitary fishing butt and reel seat assembly which minimizes the costs and assembly time associated with manufacturing such a device while at the same time, maintaining the structural integrity of the device necessary to withstand the large bending forces and loads which such devices are subjected to. Any such unitary fishing butt should be relatively light weight so as facilitate its maneuverability when used during fishing and delay the fatigue of the user. It would also be highly beneficial to provide a unitary fishing butt and reel seat assembly which offers an insulative material sleeve which can accommodate the different thermal expansion rates of the materials used in the device and further, which can be easily replaced, if desired.

SUMMARY OF THE INVENTION

The present invention is directed towards an improved fishing butt and reel seat assembly designed to address the needs which remain in the art. The fishing butt and reel seat assembly of the present invention comprises a substantially strong, rigid, one piece rod having a first open end and a second open end and a main length extending therebetween, which is preferably hollow, in open communication with the open ends, and of a circular cross section. The rod of the present invention preferably includes both a reel seat portion and a shank portion, and further, the exterior diameter of the shank portion is preferably larger than that of the reel seat portion. The reel seat portion is sized to receive a fishing reel seat thereon and includes means for securely receiving and retaining the fishing reel thereon, which means are movably mounted on the reel seat portion. Preferably, the reel seat portion includes an abutment section located generally adjacent the shank portion of the rod which is defined by an exterior diameter that is larger than that of the reel seat portion but smaller than that of the shank portion. Preferably, the second end of the shank portion includes a gimbal receiving portion characterized by a reduced exterior diameter which is smaller than that of the main length of the shank portion.

In the preferred embodiment, the fishing butt and reel seat assembly of the present invention further comprises a gripping sleeve, the gripping sleeve having a first open end, a second open end and a main tubular body extending therebetween which is sized to generally correspond the shank portion of the rod. The gripping sleeve is structured to be slidably mounted on and secured to the shank portion of the rod. Preferably, the gripping sleeve is formed of a substantially rigid, yet light weight insulative material such as nylon, which can accommodate has its own thermal expansion rate but can accommodate a different thermal expansion rate of the one piece rod which makes up the fishing butt and reel seat assembly. Also preferably, the gripping sleeve includes a plurality of longitudinally disposed ribs formed on an inner wall surface thereof to maintain the gripping sleeve at a small, spaced apart distance from the outer surface of the one piece rod. Additionally, the fishing butt and reel seat assembly of the present invention further comprises a gimbal structured to be slidably mounted and secured on the shank portion of the rod generally near the second open end, preferably on a gimbal receiving portion defined thereat, which gimbal is sized to fit in abutting engagement with the second open end of the gripping sleeve.

It is an object of the present invention to provide an improved fishing butt and reel seat assembly which comprises an integral, one-piece rod or shaft and which further minimizes the materials utilized to, assembly time needed to and the overall costs associated with the manufacture of such an assembly.

An advantage of the present invention is that the one piece rod or shaft which includes both a reel seat portion and shank portion, both of which can be entirely formed by one machine instead of by several machines as is required of fishing butt devices presently known in the art.

A feature of the present invention is that the gripping sleeve can be slidably mounted onto the shank portion of the rod and can be removed and replaced with another gripping sleeve, if desired.

It is a further object of the present invention to provide a fishing butt and reel seat assembly which is strong and durable so as to withstand the stress and bending forces encountered during sport fishing.

It is also an object of the present invention to provide a fishing butt and reel seat assembly which is sufficiently strong and stress resistant and yet, which will not be heavy, cumbersome nor fatiguing to the fisherman utilizing the invention.

Another object of the present invention is to provide a fishing butt and reel seat assembly which is light weight relative to known devices and therefore, may also be used while trolling or drifting in a boat for fish as well as for deep sea fishing regardless of whether the fisherman is seated in a "fighting chair" or is standing up, with either the rod in a "fighting belt" or in fishing rod holder on the boat.

Yet another object of the present invention is to provide a fishing butt and reel seat assembly wherein the materials used to construct the invention will be tolerant of the different rates of thermal expansion.

These and other objects, features and advantages of the present invention will become more apparent from the following more detailed description and the appended drawings.

BRIEF DESCRIPTION OF THE DRAWINGS

For a fuller understanding of the nature of the present invention, reference should be had to the following detailed description taken in connection with the accompanying drawings in which:

FIG. 1 is a side view of the integral, one-piece rod according to the present invention which includes both a reel seat portion and a shank portion.

FIG. 2A is a side view of the gripping sleeve according to the present invention.

FIG. 2B is a cross-sectional view of the gripping sleeve shown in FIG. 2-A.

FIG. 3 is a perspective view illustrating the fishing butt and reel seat assembly of the present invention in assembled form but without either a fishing rod blank or a fishing reel.

FIG. 4A is a front view and FIG. 4-B is a side view of one form of the means for securely receiving and retaining a fishing reel on the reel seat portion of the invention.

FIG. 5 is a partial perspective view of the fishing butt and reel seat assembly according to the present invention, in fully assembled form showing both a fishing rod blank and a fishing reel mounted thereto.

Like reference numerals refer to like parts throughout the several views of the drawings.

DETAILED DESCRIPTION OF THE PREFERRED EMBODIMENT

Shown throughout FIGS. 1–5, the present invention is directed towards an improved fishing butt and reel seat assembly, generally indicated as 10. The assembly is seen to comprise an elongate rod 20, including a reel seat portion 30 and a shank portion 40, a gripping sleeve 50, and a gimbal 60. Referring to FIG. 1, the invention is seen to comprise an elongate, substantially strong, rigid, one piece rod 20 which has a first open end 22, a second open end 24, and a main length 23 extending between the first and second ends, which is preferably circular in its cross section. In the preferred embodiment, the rod is formed of a high strength metallic material, such as steel, although most preferably, a high strength but substantially light weight metallic material such as aluminum will be used. Also in the preferred embodiment, the interior of the rod 20 is hollow, in open communication with open ends 22 and 24, and has a substantially constant inner diameter to accommodate the insertion of a fishing rod blank 70 into first open end 22 and into the hollow interior of the main length 23.

The rod 20 of the present invention is seen to include a reel seat portion 30 which is structured and sized to receive a fishing reel 80 thereon, as illustrated in FIG. 5. The reel seat portion 30 includes retaining means 32 for securely retaining the fishing reel 80 on the reel seat portion 30 in the desired position. In the preferred embodiment, the retaining means 32 comprise in part, a threaded zone 33 formed on the outer surface of the first rod end 22, which threaded zone ideally extends from first rod end 22 and onto reel seat portion 30 by generally about between one inch to three inches. In this preferred embodiment, the threaded zone 33 interacts with additional retaining means, as described below. The reel seat portion 30 of the present invention further includes an abutment section 39, the purpose of which will become clear from the explanation below. Abutment section 39 is preferably located generally adjacent to the shank portion 40 of the rod 20, and is preferably characterized by a section on the rod length 23 which has an enlarged exterior diameter, as best illustrated in FIG. 1. In the most preferred embodiment, the abutment section is formed to extend on the rod at generally about one inch in length and to be generally raised from the outer surface of the rod. That is, as illustrated in FIG. 1, the exterior diameter of the abutment section 39 is preferably larger than that of the reel seat portion 30, and further however, it is also preferably smaller than the exterior diameter of the shank portion 40. Ideally, the enlarged exterior diameter of the abutment section is sized so as to tightly and perhaps permanently receive thereon a lower annular hood, such as 37, by way of a "press fit", which will be described more fully below.

Referring now to FIGS. 3–5, in a preferred embodiment the present invention comprises additional retaining means 32 for securely retaining the fishing reel 80 on the reel seat portion 30 in the desired position. Preferably, the additional retaining means are movable with respect to the rod 20 and reel seat portion 30 to permit some adjustment so as to accommodate variously sized fishing reels. In the preferred embodiment, the additional retaining means 32 comprise at least one locking nut 34 and at least one annular hood 37. In the most preferred embodiment however, there are a pair of locking nuts, 34 and 35, and a pair of annular hoods, 36 and 37, the latter of which will be discussed first. As shown in FIGS. 4-A and 4-B, each annular hood 36 and 37 comprises a one-piece cylindrical ring which includes a slot 36' or 37' configured to receive a leg 82 or 84 of a conventional fishing reel 80. To accomplish assembly of the retaining means, a first annual hood 37 is mounted onto rod end 22 and may be slid downwardly over the reel seat portion 30 and into snug engagement on or over the abutment section 39, to act as a lower hood. Preferably, however, annular hood 37 is sized and configured to be so tightly fit onto abutment section 39 that it is "press fit" into place and will remain that way perhaps permanently. Second hood 36 is also mounted onto rod end 22 and is slid downwardly and onto reel seat portion 30 where it may slide freely until a fishing reel 80 is received thereon whereupon, it will function as an upper hood, see FIG. 5. Still referring to FIG. 5, in order to position a fishing reel 80 on reel seat portion 30, one leg 84 of the fishing reel 80 is placed in a slot 37' of the first annular hood 37' and the other leg 82 of the fishing reel 80 is placed in a slot 36' of the second annular hood 36. At this point, at least one of the locking nuts, such as 35, is mounted onto rod end 22 and is threaded in the same downwardly direction into snug engagement with upper hood 36. Preferably however, and given that the vibration from the boat or even a generator thereon might loosen the lock nut 35, a second lock nut 34 will also be mounted onto rod end 22 and threaded in the same downwardly direction into snug engagement with first lock nut 35 so as to prevent all movement thereof and to securely maintain the fishing reel 80 on the reel seat portion 30 even during the application of enormous stress while being utilized in deep sea fishing.

Referring again to FIG. 1, the elongate, one piece rod 20 of the present invention further comprises a shank portion 40 in addition to reel seat portion 30. In the preferred embodiment, shank portion 40 extends generally from reel seat portion 30 and ideally, from abutment section 39, and is generally greater in length than reel seat portion 30 as this is the portion which will be handled and will act as a lever in fighting a hooked fish. A preferred feature of the shank portion 40 is that it includes an exterior diameter which is larger than that of the reel seat portion 20, and abutment section 39 of the rod 20 so as to enable a handling of the substantial stresses to which it is exposed during deep sea fishing. That is, as best shown in FIG. 1, in a most preferred embodiment, the shank portion 40 has the largest exterior diameter of the rod 20, which is larger than both that of the abutment section 39 and the reel seat portion 30. In addition, the thickness of the wall section of rod 20 at shank portion 40 is in the preferred embodiment generally about $93/1000$'s of an inch to $100/1000$'s of an inch so as to offer a shank portion which is substantially stronger than those previously known in the art. As such, it is thought that the shank portion 40 of the present invention is able to withstand strong flexing forces and that it is no longer necessary for the rod blank 70, see FIG. 5, to extend all the way into the shank portion 40. Consequently, a manufacturer of fishing rods may utilize a shorter rod blank 70 and reduce production costs. If desired, the shank portion 40 may be left during manufacture with a roughened surface, such as a series of small grooves and ridges thereon or even a scoring thereacross, to further save on manufacturing time and this feature may actually serve a useful purpose, which will soon become clear. From the foregoing description, it will be appreciated that the elongate, one piece rod 20, including the reel seat portion 30 and the shank portion 40 can be formed rather easily from a single machine during the manufacturing process, such as a conventional lathe or a turret lathe. More specifically, the rod 20 as well as the reel seat and shank portions 30 and 40 can easily be formed of and from a single elongate rod of metallic material having a constant outer diameter so as to yield a rod 20 which has substantially the same inner diameter but an external diameter that varies, as described to exist between the reel seat portion 30, the abutment section 39 and the shank portion 40. Consequently, a single lathe or other machine can be used to make the requisite number of passes so as to form same in one set-up. It will be appreciated that since the shank portion 40 is both the longest portion of the rod 20 as well as that which has the largest outer diameter, the external diameter of the elongate rod before machining should be generally about or near to the desired resulting outer diameter for the shank portion 40; this minimizes the amount of machining required to produce the fishing butt and reel seat assembly 10 of the present invention. Those of ordinary skill in the art will recognize this as effecting a major reduction in the costs associated with manufacturing such devices as less materials are required, less time is necessary, and little assembly is required.

In the preferred embodiment of the present invention, the shank portion 40 includes a gimbal receiving portion 45. As best shown in FIG. 1, the gimbal receiving portion 45 is formed at the second end 24 of the shank portion 40, and ideally, includes an exterior diameter which is reduced or smaller than that of the main length 23 of the shank portion 40. In this embodiment, a step 48 is formed at the junction between shank portion 40 and gimbal receiving portion 45 which step 48 will act not only as a stop for the gimbal 65 to be received on gimbal receiving portion 45 but also as a transfer zone for transferring the substantial forces which can be exerted upon the gimbal 60 during fishing to the main length of the rod 23.

Referring now to FIGS. 2A and 2B, the present invention is seen to further include a gripping sleeve 50. Gripping sleeve 50, includes a first end 52, a second 54 and a main length 55 extending between ends 52, 54. Gripping sleeve 50 is structured, disposed and configured to be slidably mounted onto the shank portion 40 into abutting engagement with the first annular hood 37 as shown in FIG. 3. In the preferred embodiment, the gripping sleeve 50 is sized to generally correspond the length of shank portion 40. In a most preferred embodiment, the gripping sleeve is formed to include a textured appearance so as to offer a better grip to the fisherman that eventually uses the product, even when his hands are wet and/or a bit slimy. Also, given the harsh and straining forces at work on the assembly during deep sea fishing, the gripping sleeve 50 should be securely mounted onto the shank portion 40, and to accomplish this, an adhesive material such as a bonding cement or semi-rigid or flexible epoxy is coated onto the shank portion 40, so as to cover the roughened surface thereof, prior to the mounting of the gripping sleeve 50 onto shank portion 40. To aid with assembly, it is preferred that the inner surface of the gripping sleeve walls be formed to taper from wider at the first end 52 towards the main length thereof 55 and if desired, to second end 54. Once the adhesive agent is applied to the shank portion 40 of rod 20, and the gripping sleeve 50 is mounted onto first rod end 24, this feature will facilitate the sliding passage of the gripping sleeve onto the rod, with minimal clumping or other undesired moving of the adhesive agent. Also, it should be pointed out that the internal diameter of gripping sleeve 50 is formed to be larger than the exterior diameter of the shank portion 40, so as to provide some room for the adhesive agent applied to bond more effectively and in this regard, if the shank portion has been left with a roughened surface such as a series of ridges or grooves, this will further aid the bonding action of the adhesive agent. Also, because the internal diameter of the gripping sleeve 50 is larger than the exterior diameter of the shank portion 40, the space which is occupied by the adhesive agent can further act as a cushion between the shank portion of the rod 20 and the gripping sleeve 50, to help protect the device despite the rigorous forces to which it is subjected during deep sea fishing. Preferably, the internal diameter of the gripping sleeve 50 will not be significantly larger than the external diameter of the shank portion 40, and ideally the difference will be generally about $5/1000$'s to $10/1000$'s of an inch. As has been described, most deep sea fishing occurs in highly sunny conditions with no shade available and therefore, the present invention may be exposed to a natural heating element, namely the sun's rays. Accordingly, the gripping sleeve 50 is preferably constructed of an insulative material which will not heat rapidly and which will otherwise be comfortable for the user handling same during sport fishing. In a preferred embodiment, gripping sleeve 50 will be constructed of a substantially rigid, yet light weight insulative material such as nylon or a nylon composition with nylon fillers, which if desired, could be cut away and off of the shank portion 40 and replaced by a new gripping sleeve 50. In a more preferred embodiment, the gripping sleeve will be formed by way of a molding process and of a glass filled nylon material of about fifteen (15%) percent. Also significant, the layer of adhesive material between the gripping sleeve 50 and the shank portion 40 acts as a cushion to lessen or diminish the heating effect of the sun on the different materials, i.e., the metallic rod 20 and the insulative gripping sleeve 50 which because of their different rates of thermal expansion and contraction, have been known to cause problems to other prior art devices. From the foregoing, it will be appreciated by those of ordinary skill in the art that the void which exists between the inner diameter of the gripping sleeve 50 and the external diameter of the shank portion 40, which is almost substantially occupied by adhesive material, protects against and prevents the cracking of the gripping sleeve due to the differing thermal expansion rates of the materials used in the assembly.

In this regard, and as illustrated in FIG. 2-B, in a more preferred embodiment the gripping sleeve 50 of the present invention includes a plurality of longitudinally disposed ribs 56 formed on an inner wall surface thereof. The plurality of ribs 56 are structured and disposed to contact the outer surface of the rod 20 when the gripping sleeve 50 is mounted thereto, and thereby, to maintain the main length of the gripping sleeve 50 at a small, spaced-apart distance from the outer surface of the rod 20. In this regard, it is preferable that each one of the plurality of ribs 56, which ideally comprise between three to five individual ribs, will extend longitudinally in generally parallel relation to each other, across the inner surface of main length 55 of the gripping sleeve from first end 52 thereof to second end 54 thereof. It is believed by the inventor hereof that the plurality of ribs 56 assist with the adhesive bonding of the gripping sleeve 50 to the shank portion 40 of the rod 20 and lessen or diminish the heating effect of the sun on the different materials. It is also believed by the inventor hereof that the plurality of ribs help to maintain the gripping sleeve 50 in an evenly spaced configuration around the shaft portion 40 of the rod 20. That is, that the ribs help to evenly space the gripping sleeve apart from the rod 20 and thereby, to smooth out any uneven edges on the outer surface of the rod. This in turn means that during manufacture, the exterior diameters of the shank and gimbal receiving portions 40, 45 of the rod 20 can be formed less perfectly, i.e., the tolerances normally required for such machining do not have to be as precise, which again, greatly saves in manufacturing time and costs.

Referring now to FIGS. 3 and 5, the present invention is seen to further include a gimbal 60. The gimbal 60 of the present invention includes an open mouth 62 and a skirt portion 64 about an inner bore which is preferably structured to be slidably mounted and secured on the gimbal receiving portion 45 of the rod. Preferably, the gimbal 60 is secured to the rod by way of an adhesive material such as a bonding cement or a semi-rigid or flexible epoxy coated onto the shank portion 40, and more preferably on a gimbal receiving portion 45 of rod 20, prior to the mounting of the gimbal thereon. In this regard, gimbal 60 is ideally also constructed of a substantially rigid, yet light weight insulative material such as plastic or nylon. In a more preferred embodiment, the gimbal 60 will also be formed by way of a molding process and of a nylon material or nylon composition such as nylon 6 or nylon 66. Also, the gimbal 60 is preferably sized so that when assembled on gimbal receiving portion 45, the open mouth 62 of the gimbal is in abutting engagement with the shank portion 40 of the rod 20, preferably at step 48, as well as with the gripping sleeve 50 thereon. In the preferred embodiment, the skirt portion 64 of the gimbal includes a plurality of longitudinally disposed ribs on the inner circumferential skirt wall as well as a substantially thickened base pad 65 at the ceiling wall thereof. The base pad 65 is structured and disposed to act as a shock absorber when the fishing butt and reel seat assembly are jarred against a hard surface, as is common during use. Thus, it is contemplated that most commonly, the fishing rod blank 70 will extend through the gimbal 60 and abut the thickened base pad 65, as shown in FIG. 5.

From the foregoing, it should now be appreciated that the present invention for a fishing rod butt and reel seat assembly significantly minimizes both the manufacturing costs and assembly time needed to yield a finished product over what has previously been known in the art. Specifically, a single machine or lathe can be used to form the rod 20, even though there are three or four varied external diameters thereon, in the preferred embodiments, all with a substantially constant inner diameter and means, such as a threaded zone, for securing and retaining a fishing reel thereon. If desired, all portions thereof and preferably, at least the largest portion thereof, namely, the shank portion 40 can be left during manufacture with a roughened surface, which again saves time and additional machining costs. A lower annular hood, such as 37 can quickly be press fitted onto the abutment section 39 and the other retaining means assembled in place on the reel seat portion 30. Once an adhesive agent is applied to the shank portion 40 of the rod, the gripping sleeve 50 and the gimbal 60, both of which can be formed by a molding process, can then be mounted on the shank portion, to provide a finished device which is substantially strong and able to withstand the large bending forces, loads and otherwise heavy duty use to which it will be subjected during deep sea fishing.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A fishing butt and reel seat assembly designed for use with a fishing reel and a fishing rod blank, said assembly comprising:
   a) a substantially strong, rigid, one-piece rod having a first and a second open end and a main length extending between said ends, a hollow interior in communication with said open ends, said hollow interior having a circular cross section and a substantially constant inner diameter;
   b) said rod having a reel seat portion, a shank portion, and a gimbal receiving portion, said shank portion having an exterior diameter larger than an exterior diameter of said reel seat portion and said gimbal receiving portion;
   c) said reel seat portion including an abutment section with an enlarged exterior diameter, said abutment section being disposed generally adjacent said shank portion and having an exterior diameter larger than an exterior diameter of said reel seat portion and smaller than said exterior diameter of said shank portion;
   d) retaining means on said reel seat portion for securely retaining the fishing reel on said reel seat portion;
   e) a gripping sleeve having a first and a second open end and a main length extending therebetween, said gripping sleeve further including an inner surface formed to have a tapered configuration, said first and second open ends sized to generally correspond to said shank portion of said rod, said gripping sleeve slidably mounted and secured on said shank portion of said rod; and
   f) a gimbal structured to be slidably mounted and secured on said gimbal receiving portion of said rod in abutting engagement with said shank portion of said rod and said second open end of said gripping sleeve.

2. A fishing butt and reel seat assembly designed for use with a fishing reel and a fishing rod blank, said assembly comprising:
   a) a substantially strong, rigid, one-piece rod having a first and a second open end and a main length extending between said ends, a hollow interior in communication with said open ends, said hollow interior having a circular cross section and a substantially constant inner diameter;
   b) said rod having a reel seat portion, a shank portion, and a gimbal receiving portion, said shank portion having an exterior diameter larger than an exterior diameter of said reel seat portion and said gimbal receiving portion;
   c) said reel seat portion including an abutment section with an enlarged exterior diameter, said abutment section being disposed generally adjacent said shank portion and having an exterior diameter larger than an exterior diameter of said reel seat portion and smaller than said exterior diameter of said shank portion;
   d) retaining means on said reel seat portion for securely retaining the fishing reel on said reel seat portion; said retaining means comprising at least one annular hood having an inner diameter sized and structured to be press fit over and maintained on said abutment section, said inner diameter of said annular hood being smaller than said exterior diameter of the shank portion so that said annular hood stoppingly abuts said shank portion;
   e) a gripping sleeve having a first and a second open end and a main length extending between said ends sized to generally correspond to said shank portion of said rod, said gripping sleeve slidably mounted and secured on said shank portion of said rod; and
   f) a gimbal structured to be slidably mounted and secured on said gimbal receiving portion of said rod in abutting engagement with said shank portion of said rod and said second open end of said gripping sleeve.

3. A fishing butt and reel seat assembly as recited in claim 2 wherein said retaining means comprise an externally threaded zone on said rod.

4. A fishing butt and reel seat assembly as recited in claim 3 wherein said the retaining means comprises at least one locking member threadably mounted to said externatelly threaded zones on said rod.

5. A fishing butt and reel seat assembly as recited in claim 2 wherein said retaining means comprise an externally threaded section generally adjacent said first open end of said rod and said reel seat portion, and:
   a) a first and a second annular hood, each hood being structured and disposed to slide over said reel seat portion and to partially receive a foot of the fishing reel;
   b) said first annular hood being disposed adjacent said first open end of said gripping sleeve and defining a lower hood, said second annular hood being disposed generally adjacent said externally threaded zone of said rod and defining an upper hood, with the fishing reel being disposed on said reel seat portion between said first and second annular hoods;
   c) a first and a second internally threaded locking nut, each being removably mounted to externally threaded zone of said rod and being movable therealong, said first locking nut being disposed in abutting engagement with said second upper hood and said second locking nut being disposed in abutting engagement with said first locking nut.

6. A fishing butt and reel seat assembly as recited in claim 2 wherein said gripping sleeve is securely mounted to said shank-portion of said rod by a resilient adhesive material.

7. A fishing butt and reel seat assembly as recited in claim 6 wherein said gripping sleeve includes a textured appearance.

8. A fishing butt and reel seat assembly as recited in claim 2 wherein said gripping sleeve includes a plurality of ribs longitudinally disposed on an inner wall surface thereof, said ribs structured to contact said shank portion and maintain said inner wall surface of said gripping sleeve at a spaced apart distance from said shank portion.

9. A fishing butt and reel seat assembly as recited in claim 2 wherein said gripping sleeve is constructed of an insulative material.

10. A fishing butt and reel seat assembly as recited in claim 2 wherein said gripping sleeve is constructed of a nylon material.

11. A fishing butt and reel seat assembly as recited in claim 2 wherein said gripping sleeve is removable from said shank portion and replaceable with another said gripping sleeve.

12. A fishing butt and reel seat assembly as recited in claim 2 wherein said gimbal includes an impact absorbing pad.

13. A fishing butt and reel seat assembly as recited in claim 12 wherein said gimbal is formed of a nylon material.

14. A fishing butt and reel seat assembly as recited in claim 13 wherein said gimbal includes a plurality of ribs longitudinally disposed on an inner wall surface thereof, said ribs structured to contact said gimbal receiving portion and maintain said inner wall surface of said gimbal at a spaced-apart distance from said gimbal receiving portion.

15. A fishing butt and reel seat assembly as recited in claim 2 wherein said shank portion is provided with a roughened exterior surface.

16. A fishing butt and reel seat assembly designed for use with a fishing reel and a fishing rod blank, said assembly comprising:
  a) a substantially strong, rigid, one-piece rod having a first and a second open end and a main length extending between said ends, a hollow interior in communication with said open ends, said hollow interior having a circular cross section and a substantially constant inner diameter;
  b) said rod having a reel seat portion, a shank portion, and a gimbal receiving portion, said shank portion having an exterior diameter larger than an exterior diameter of said reel seat portion and said gimbal receiving portion;
  c) said reel seat portion including an abutment section with an enlarged exterior diameter, said abutment section being disposed generally adjacent said shank portion and having an exterior diameter larger than an exterior diameter of said reel seat portion and smaller than said exterior diameter of said shank portion;
  d) retaining means on said reel seat portion for securely retaining the fishing reel on said reel seat portion;
  e) a gripping sleeve having a first and a second open end and a main length extending therebetween and including an inner wall surface formed to have a tapered configuration being wider at said first open end and narrower along said main length towards said second open end, said first and second open ends sized to generally correspond to said shank portion of said rod, said gripping sleeve slidably mounted and secured on said shank portion of said rod; and
  f) a gimbal structured to be slidably mounted and secured on said gimbal receiving portion of said rod in abutting engagement with said shank portion of said rod and said second open end of said gripping sleeve.

\* \* \* \* \*